3,435,045
PRODUCTION OF 3,4,5,6-TETRAHYDROPYRIDINE DERIVATIVES CONTAINING γ-AMINOPROPYL GROUPS
Gerhard Daum, Cologne-Raderberg, Rudolf Modic, Lulsdorf uber Troisdorf, and Hermann Richtzenhain, Cologne-Sulz, Germany, assignors to Dynamit Nobel Aktiengesellschaft, Troisdorf, Germany, a corporation of Germany
No Drawing. Continuation-in-part of application Ser. No. 336,084, Nov. 29, 1963. This application Sept. 11, 1967, Ser. No. 666,929
Claims priority, application Germany, Nov. 28, 1962, D 372
Int. Cl. C07d 31/02, 33/02, 29/38
U.S. Cl. 260—296                    21 Claims

ABSTRACT OF THE DISCLOSURE

A novel class of 3,4,5,6-tetrahydropyridine derivatives is disclosed having the formula:

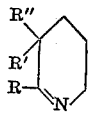

wherein R is lower alkyl or lower alkenyl, R' is γ-aminopropyl, lower alkyl, or lower alkenyl and R" is γ-aminopropyl, wherein R and R' taken together within the carbon atoms to which they are attached may form a carbocyclic radical. These novel 3,4,5,6-tetrahydropyridine derivatives are prepared by hydrogenating a di- or tricyanethylated ketone at a temperature of less than 180° C. in the presence of a hydrogenation catalyst.

The 3,4,5,6-tetrahydropyridine derivatives of the invention can be used to great advantage as hardening agents for epoxy resins.

---

This application is a continuation-in-part of application Ser. No. 336,084, filed Nov. 29, 1963, and now abandoned.

This invention relates to the production of 3,4,5,6-tetrahydropyridine derivatives containing γ-aminopropyl groups and more particularly to the production of 3,4,5,6-tetrahydropyridine derivatives containing γ-aminopropyl groups by hydrogenation of ketones substituted by more than one β-cyanethyl group in the α-position in relation to the carbonyl group.

The production of substituted piperidine derivatives by hydrogenation of nitriles having a carbonyl group in the δ-position in relation to the nitrile group has already been disclosed. For example, N. F. Albertson (J. Am. Chem. Soc., 72, 2594–99 (1950)) has described the production of 2,3-dimethyl-3-(γ-aminopropyl)-piperidine from 3,3-bis (β-cyanethyl)-butanone-(2). The formation of the piperidine derivatives by the aforesaid method has been explained on the basis that an amino group formed by hydrogenation from the nitrile group reacts with the carbonyl group under splitting off of water and that the carbon-nitrogen double bond thus formed is further hydrogenated. Piperidine derivatives are formed according to Houben-Weyl, 4th ed., vol. XI, 1. 358 (1957), from all of those compounds in which an amino group can be produced by reduction in the δ-position in relation to the carbonyl group.

It is among the objects of this invention to provide a method of making 3,4,5,6-tetrahydropyridine derivatives containing γ-aminopropyl groups from a nitrile having more than one β-cyanethyl group in the α-position in relation to the carbonyl group.

Another object is to provide a method of making 3,4,5,6-tetrahydropyridine derivatives containing γ-aminopropyl groups from a nitrile having more than one β-cyanethyl group in the α-position in relation to the carbonyl group that is simple, easily, and safely practiced and efficient.

A still further object of this invention is the preparation of novel 3,4,5,6-tetrahydropyridine derivatives containing γ-aminopropyl groups.

Still another object of the invention is the preparation of hardening agents for hardening epoxy resins and the resultant hardened products.

These and other objects will become apparent during the following discussion.

Now, in accordance with the invention, it has been found that 3,4,5,6-tetrahydropyridine derivatives containing γ-aminopropyl groups can be prepared from nitriles having more than one β-cyanethyl group in the α-position with respect to the carbonyl group; that is nitriles having a carbonyl group in the δ-position in relation to the nitrile group can be hydrogenated to form 3,4,5,6-tetrahydropyridine derivatives in excellent yields. The hydrogenation to form the tetrahydropyridine derivative is conducted so surprisingly simply and easily that, after the hydrogen necessary for the reduction of the nitrile groups has been absorbed, no further measures are necessary to prevent the absorption of another mol of hydrogen and whereby the hydrogenation of the carbon-nitrogen double bond formed takes place. Following the completion of the absorption of hydrogen, tetrahydropyridine derivatives are obtained which, in addition to the secondary and tertiary amines usually produced, contain only slight amounts of the piperidine derivative involved.

The formation of 3,4,5,6-tetrahydropyridine derivatives in large yields and as the predominant reaction product is established by elemental analysis and by infrared spectrum analysis.

The hydrogenation of the nitriles in accordance with the present invention is carried out most advantageously in the presence of solvents, such as for example, aliphatic alcohols, e.g., methanol, ethanol, isopropylic and isobutylic alcohol, or aliphatic or cyclic ethers, e.g., tetrahydrofuran, dioxane etc., and in the presence of hydrogenation catalysts. The hydrogenation is effected to a surprisingly good degree even in the presence of water. The known catalysts, such as Raney nickel, Raney cobalt, or nickel on supporting substances can be used as hydrogenation catalysts. Depending on the activity of the catalyst, the hydrogenation can be conducted at temperatures ranging from 40–180° C. Particularly good results are obtained when the hydrogenation reaction is conducted at a temperature within the range of 80–150° C. The hydrogen pressure as a rule should be less than 150 atmospheres. Preferably, the hydrogenation is conducted in the pressure range of between 5–100 atmospheres.

Since a greater or lesser percentage of condensed secondary or tertiary amines is formed in addition to primary amines during the hydrogenation of the nitriles, it is advantageous to carry out the hydrogenation in the process of the invention in the presence of ammonia.

The addition of small amounts of strongly basically reacting compounds, such as alkali hydroxides, alkali alcoholates, or quaternary ammonium bases has an effect similar to that of ammonia. The amount of strongly basically reacting compounds can vary from 0.1–10 mol percent, preferably from 0.5–5 mol percent, based on the moles of cyanethylated compound to be hydrogenataed. Hydrogenation effected in the presence of ammonia and of the above-mentioned alkaline reacting compounds has proven particularly advantageous. Hydrogenation in the presence of ammonia and with the addition of very small amounts of a monovalent or polyvalent phenol, such as phenol, cresol, i.e., hydroquinone, resorcinol, etc., has proven to be most particularly advantageous both as regards yield and as regards velocity of the hydrogenation as can be seen from the following table:

TABLE

Hydrogenation of 1,1,1-tris-(β-cyanethyl)-propanone-(2)-in methanol in the presence of various additives

[Catalyst: Nickel on kieselguhr commercially available as Girdler G49A]
[Additive: Percent yield of 2-methyl-3,3-bis-(γ-aminopropyl)-3,3,4,5-tetrahydropyridine]

| | |
|---|---|
| — | 54 |
| NH₃ | 61 |
| Sodium methylate | 62 |
| Phenol | 61 |
| Hydroquinone | 66.4 |
| NH₃ plus trimethyl-benzyl-ammonium hydroxide | 76 |
| NH₃ plus sodium methylate | 78.8 |
| NH₃ plus hydroquinone | 82.5 |

As starting materials, for the present reaction, there are applicable, for instance, the cyanethylation products of aliphatic, cycloaliphatic, and aliphatic-aromatic carbonyl compounds containing at least two β-cyanethyl groups, such as, for instance, 1,1-bis-(β-cyanethyl)-propanone - (2), 1,1,1-tris(β-cyanethyl)-propanone-(2), 2,2-bis-(β-cyanethyl)-butanone-(3), 2-methyl-3,3-bis-(β-cyanethyl)-pentene-(1)-one-(4), ω,ω,ω-tris-(β-cyanethyl)-acetophenone.

Ketonitriles having additional substituents to those above set out can also be used in accordance with the present invention.

The tetrahydropyridine derivatives obtainable by the present process are most suitable for use as intermediates in the manufacture of pharmaceuticals, vulcanization accelerators and the like. The tetrahydropyridine derivatives of the invention are particularly suitable for use as hardeners for epoxy resins.

The epoxy resins which can be hardened by means of the hydrogenation products of cyanethylated ketones include compounds which contain at least two 1,2-epoxy groups in their molecules. These include primarily di- or polyglycidyl ethers of polyvalent alcohols, polyvalent phenols, phenol alcohols, phenol aldehyde resins and the like, which are easily obtained by reaction of one of the materials with epichlorhydrin or a similar compound. In addition to the glycidyl ethers, polyglycidyl compounds which contain glycidyl groups bound to nitrogen or sulfur can also be hardened with the tetrahydropyridine derivatives of the invention, such as, for example, N,N-diglycidylaniline, diglycidyl sulfide and the like. In addition to the above-named glycidyl compounds, polyepoxy resins can be hardened which are manufactured by the direct epoxidation of polyunsaturated aliphatic or cycloaliphatic compounds. The following are mentioned as representatives of the large group of these compounds: more or less completely epoxidized homopolymers or copolymers of dienes, diepoxides of butadiene, isoprene, 1,5-hexadiene, dicyclopentadiene, vinylcyclohexene, cyclododecadiene or cyclododecatriene and the like.

Fillers, plasticizers such as dibutyl phthalate, or reactive diluents such as glycidyl ethers of monovalent alcohols, or phenols can, of course, be added to the above-named polyepoxides prior to the hardening. The hardening can be accelerated by the addition of phenol or similarly acting compounds. The hardening of the epoxy resins with the hydrogenation products of cyanethylated ketones of the invention is carried out at room temperature, although it can also be performed at higher temperatures. The amount of hardening agent, i.e., tetrahydropyridine derivative to be added is as a rule such that a hydrogen atom bound to a nitrogen atom is available for each epoxy group. However, it is also possible to use an excess or a hypostoichiometric amount of the hardening agent. One special advantage is that molded articles or coatings made from epoxy resins and the tetrahydropyridine derivative hardening agent have non-sticky surfaces after a substantially shorter reaction time than comparable commercial amine hardeners. Fully hardened mixtures are characterized not only by very good strength characteristics but also by an exceptional surface gloss. These good surface characteristics open a broad field of application for the epoxy resins hardened with the tetrahydropyridine derivatives according to the invention.

Further, the products hardened with the tetrahydropyridine derivatives of the invention are characterized by a very good resistance to chemicals. For example, during storage in gasoline, heating oil, benzol, xylene, butanol, carbon tetrachloride, perchlorethylene or 40% caustic soda solution they undergo no more than a negligible increase in weight.

The more detailed practice of the invention is illustrated by the following examples. These are, of course, many forms of the invention other than these specific embodiments.

Example 1

A mixture of 150 g. 1,1,1-tris-(β-cyanethyl)-propanone-(2) and 600 ml. methanol was hydrogenated under a hydrogen pressure of 50 atm. and a temperature of 110–115° C., in the presence of 20 grams of a nickel catalyst (commercially available as Girdler G 49A). The hydrogen absorption was completed after about 40 minutes. After filtering out the catalyst and evaporating off the solvent, 79 grams (54% of theory) of 2-methyl-3,3-bis-(γ-aminopropyl)-3,4,5,6-tetrahydropyridine were obtained by vacuum distillation. The boiling point of the 2-methyl-3,3-bis-(γ-aminopropyl)-3,4,5,6-tetrahydropyridine at 0.1 torr was 120–135° C.

$C_{12}H_{25}N_3$ (mol. wt. 211.3). Calculated: C, 68.20%; H, 11.92%; N, 19.89%; N as $NH_2$ (Van Slyke), 19.89%. Found: C, 68.04%; H, 12.08%; N, 19.97%; N as $NH_2$ (Van Slyke), 18.66%.

(Van Slyke's method of nitrogen determination gives approximately the same value as Dumas' method, due to the hydrolytic cleavage of the double bond C=N.)

Example 2

A mixture of 150 g. 1,1,1-tris-(β-cyanethyl)-propanone-(2) and 600 ml. of ammonia-saturated methanol was hydrogenated in the presence of 20 g. of nickel catalyst (as described in Example 1), under a hydrogen pressure of 50 atm. and a temperature of 100–115° C. The hydrogen absorption was completed in 40 minutes. Following purification, as described above, 89 g. (61% of theory) of 2-methyl-3,3-bis-(γ-aminopropyl)-3,4,5,6- tetrahydropyridine were obtained.

Example 3

A mixture of 150 g. 1,1,1-tris-(β-cyanethyl)-propanone-(2), 600 ml. methanol and 1 g. sodium methylate was hydrogenated under the same conditions as described in Example 2, 91 g. (62.3% of theory) of 2-methyl-3,3-bis-(γ-aminopropyl)-3,4,5,6-tetrahydropyridine were obtained.

Example 4

A mixture of 150 g. 1,1,1-tris-(β-cyanethyl)-propanone-(2), 600 ml. methanol and 0.3 g. phenol was hydrogenated under substantially the same conditions as described in Example 2, 89 grams (61% of theory) of 2 - methyl - 3,3 - bis(γ - aminopropyl) - 3,4,5,6 - tetrahydropyridine were obtained.

Example 5

A mixture of 150 g. 1,1,1-tris-(β-cyanethyl)-propanone-(2), 600 ml. methanol and 0.1 g. hydroquinone was hydrogenated under the same conditions reported in Example 2 above. 97 grams (66.4% of theory) of 2-methyl - 3,3 - bis - (γ - aminopropyl) - 3,4,5,6 - tetrahydropyridine were obtained.

Example 6

A mixture of 150 g. 1,1,1-tris-(β-cyanethyl)-propanone-(2), 600 ml. ammonia-saturated ethanol and 1 g. sodium methylate, was hydrogenated in the presence of the nickel catalyst described in Example 1 using a hydrogen pressure of 30 atm. and a temperature of 90–100° C. The yield of 2-methyl-3,3-bis-(γ-aminopropyl)-3,4,5,6-tetrahydropyridine amounted to 115 g. (78.8% of theory).

Example 7

The process of Example 6 was repeated using in place of 1 g. sodium methylate, 4 ml. of a 30% methanolic solution of trimethylbenzylammonium hydroxide. The yield of 2-methyl-3,3-bis-(γ-aminopropyl)-3,4,5,6-tetrahydropyridine amounted to 111 g. (76% of theory).

Example 8

A mixture of 200 g. 1,1,1-tris-(β-cyanethyl)-propanone-(2), 800 ml. ammonia-saturated methanol and 0.1 g. hydroquinone was hydrogenated in the presence of the nickel catalyst described in Example 1 above, under a hydrogen pressure of 50 atm. and a temperature of 100–115° C. The yield of 2-methyl-3,3-bis-(γ-aminopropyl)-3,4,5,6-tetrahydropyridine amounted to 160 g. (82.5% of theory).

Example 9

A solution of 90 g. 3,3-bis-(β-cyanethyl)-butanone-(2), 73 g. ammonia and 0.5 g. sodium in 400 ml. methanol in an autoclave was maintained at a temperature of 100° C. for 80 minutes under a hydrogen pressure of 130 atms. After cooling, the catalyst was filtered off, the methanol and ammonia were removed by evaporation at normal pressure, and the residue was distilled in a vacuum produced by a water-jet vacuum pump. At a temperature range of 110–125° C.$_{11mm}$, 77 g. (90% of theory) of a water-clear liquid were recovered from which pure 2,3-dimethyl-3-γ-aminopropyl-3,4,5,6-tetrahydropyridine was obtained by fractional distillation. The pure 2,3-dimethyl-3-γ-aminopropyl-3,4,5,6-tetrahydropyridine had a BP$_{11}$ of 111–113° C. The yield of pure compound amounted to 70%.

The 2,3-dimethyl-3-γ-aminopropyl-3,4,5,6-tetrahydropyridine so produced solidified following long standing at 16–18° C. into crystals which deliquesce in air.

$C_{10}H_{20}N_2$ (mol. wt. 168.3) $n_D^{25}$ 1.5050. Calculated: C, 71.37%; H, 11.98%; N, 16.65%; N as $NH_2$ (Van Slyke), 16.65%. Found: C, 71.54%; H, 11.81%; N, 16.92%; N as $NH_2$ (Van Slyke), 16.11%.

Dihydrochloride: Colorless crystals, M.P. 248–249° C. $C_{10}H_{22}N_2Cl_2$ (mol. wt. 241.2). Calculated: C, 49.79%; H, 9.19%; N, 11.61%; Cl, 29.40%. Found: C, 49.80%; H, 8.99%; N, 11.55%; Cl, 29.42%.

The higher-boiling fractions (BP$_{11}$ 114–125° C.) contain larger quantities of 2,3-dimethyl-3-γ-aminopropylpiperidine with increasing boiling point.

In the absence of metallic sodium in the hydrogenation reaction solution, the yields of crude distillate amounted to about 60% as compared to 90% for the hydrogenation effected in the presence of sodium.

Example 10

A mixture consisting of 90 g. 2-methyl-3,3-bis-(β-cyanethyl)-pentene-(1)-one-(4), 1 g. sodium methylate and 500 ml. ammonia-saturated methanol was hydrogenated at 80–100° C. under a hydrogen pressure of 100 atm. in the presence of 15 grams of Raney nickel. The hydrogen absorption was completed after 45 minutes. The reaction solution was separated from the catalyst by filtration, the solvent removed by evaporation, and the oily residue remaing vacuum-distilled. The 2-methyl-3-isopropenyl-3-(γ-aminopropyl)3,4,5,6-tetrahydropyridine thereby recovered boiled at 100–110° C. at 0.1 torr. The yield amounted to 73 g. (84.5% of theory).

$C_{12}H_{22}N_2$ (mol. wt. 194.3). Calculated: C, 74.17%; H, 11.41%; N, 14.42%; N as $NH_2$ (Van Slyke), 14.42%. Found: C, 74.11%; H, 11.56%; N 14.33%; N as $NH_2$ (Van Slyke), 14.13%

Example 11

A suspension consisting of 800 g. 1,1,1-tris-(β-cyanethyl)-propanone-(2) in 4 liters of water was hydrogenated in the presence of 100 g. of a nickel catalyst under a hydrogen pressure of 30 atm. and a temperature of 80–100° C. The hydrogen adsorption was completed after 20 minutes. Following separation of the catalyst by filtering, the water was evaporated off leaving a pale yellow, oily liquid which consisted mainly of 2-methyl-3,3-bis-[γ-aminopropyl)-3,4,5,6-tetrahydropyridine.

Example 12

A mixture of 1500 g. of 1,1,1-tris-(β-cyanethyl)-propanone-(2), 8 liters of ammonia-saturated methanol and 10 g. of sodium methylate was hydrogenated under a hydrogen pressure of 30 atmospheres at 90 to 105° C. in the presence of a nickel catalyst (commercially available under the name Girdler G 49A). The adsorption of hydrogen was completed after 45 minutes. After filtering off the catalyst and evaporating the solvent, vacuum distillation produced 1170 g. of a fraction having a BP$_{0.1}$ of 120–135° C. which consisted almost exclusively of 2-methyl-3-bis-(γ-aminopropyl)-3,4,5,6-tetrahydropyridine, which crystallized upon cooling. This distillate was designated as Hardener A.

A mixture of 80 parts of Hardener A and 20 parts of isopropanol was fluid and at 20° C. had a viscosity of 114 cp.

186 parts of 2-ethylhexylglycide ether were added, drop by drop with stirring, over a period of one hour, to 217 parts of Hardener A heated to 100° C., and the mixture formed maintained at that temperature for another hour. A yellowish oil was obtained which was designated as Hardener C.

Example 13

A mixture of 56 g. ω,ω,ω-tris-(β-cyanoethyl)-acetophenone, ½ l. of ammonia-saturated methanol, and 1 g. of sodium methylate was hydrogenated under a hydrogen pressure of 135 atms. at 100–110° C. in the presence of a nickel catalyst (commercially available under the name Girdler G 49A).

The adsorption of hydrogen was completed after 120 minutes. After filtering off the catalyst and evaporating the solvent, vacuum distillation produced 38 g. of a crude product having a BP .1–.15 mm. Hg of 180–250° C. from which pure 2-phenyl-3,3-bis(γ-aminopropyl)-3,4,5,6-tetrahydropyridine was obtained by fractional distillation as water clear, oily liquid.

BP 0.1–0.15 mm. Hg: 193–194° C.
The yield was 32 g.=59%.

$C_{17}H_{27}N_3$ (MW. 271.3) $n_D^{20}$=1.5659. Calc.: N, 15.37; $N_{NH_2}$ (Van Slyke), 15.37. Found: N, 15.61; $N_{NH_2}$ (Van Slyke), 15.30.

Example 14

A mixture of 500 g. of 3,3-bis-(β-cyanethyl)-butanone-(2), 2500 ml. of ammonia-saturated methanol and 5 g. of sodium methylate was hydrogenated in the presence of 50 g. of Raney nickel under a hydrogen pressure of 130 atmospheres. The adsorption of hydrogen was finished after 80 minutes. After the catalyst had been removed by filtration and the solvent had been removed by evaporation, 428 g. of an amine mixture was obtained by vacuum distillation which boiled at 110–125° C. under a pressure of 11 torr. and consisted mainly of 2,3-dimethyl-3-γ-aminopropyl-3,4,5,6-tetrahydropyridine along with some 2,3-dimethyl-3-γ-aminopropylpiperidine. This mixture was designated as Hardener B.

Example 15

100 parts of epoxy resin having 0.53 epoxy equivalents per 100 g. of resin, and manufactured by the conventional method from Bisphenol A and epichlorhydrin, was mixed with each of the hardeners as hereinafter set out and the resulting mixture brushed onto metal plates. In the following table, there are listed the time after which the surface of the mixtures of the various hardeners with (a) the above epoxy resin and (b) a mixture of 90 parts of the above epoxy resin and 10 parts of ethylhexylglycide ether were no longer tacky.

TABLE

|  | Time required to harden without tackiness— | |
|---|---|---|
|  | A | B |
| 28 parts Hardener A | 5 h., 15′ | 6 h., 10′ |
| 28 parts Hardener A plus 7 parts isopropanol | 4 h., 15′ | 5 h., 50′ |
| 13 parts triethylenetetramine | 12 h | 12 h |
| 27.7 parts N-cyclohexyl-1,3-diaminopropane (Laromin C 252, BASF) | 12 h | 12 h |
| 32 parts 4,4′-diaminodicyclohexylpropane | 12 h | 12 h |
| 27 parts 1,4-butyleneglycoldiaminopropyl ether | 8 h | 8 h |

Example 16

100 parts of the epoxy resin according to Example 4 were mixed with 28 parts of Hardener A and 5 parts of phenol. Molded bodies made from this mixture were non-tacky after 4 hours and hard after 10 hours. They had an excellent surface gloss. The Vicat point amounted to 123° C. and could be increased to 155° C. by one hour of heating to 100° C.

Example 17

90 parts of the epoxy resin according to Example 14, 10 parts of ethylhexylglycide ether, 28 parts of Hardener A and 5 parts of phenol were thoroughly mixed together. Molded bodies prepared from this mixture were non-tacky after 5 hours and hard after 12 hours. They had in each instance an excellent surface gloss.

Example 18

100 parts of the epoxy resin according to Example 14 are mixed with 40 parts of Hardener B, 8 parts of isopropanol and 4 parts of phenol. Molded bodies were made from this mixture and were non-tacky after 4 hours and hard after 11 hours. They had an excellent surface gloss.

Example 19

100 parts of the epoxy resin according to Example 14 were mixed with 70 parts of Hardener C and 10 parts of triphenylphosphite. Molded bodies made from this mixture were completely hardened after 24 hours. They were flexible and had excellent surface gloss.

Example 20

100 parts of the epoxy resin according to Example 14, 28 parts of Hardener A, 7 parts of isopropanol and 5 parts of phenol were mixed together. Molded bodies made from this mixture and hardened at 20° C. had the following mechanical properties:

| Bending strength | 885 kg./cm.$^2$ |
| Tensile strength | 641 kg./cm.$^2$ |
| Ball impression hardness | 1224–1136 kg./cm.$^2$ (10–60 sec.) |

After the molded bodies had been kept for 7 days in butanol, ethylene glycol, gasoline, heating oil, xylene, carbon tetrachloride, perchlorethylene or 40% caustic soda solution, the weight increase amounted to less than 0.1%.

Example 21

90 parts of the epoxy resin according to Example 14, 10 parts of ethylhexylglycide ether, 28 parts of Hardener A, 7 parts of isopropanol, 5 parts of phenol and 840 parts of corundum having a grit size of between 0 and 1 mm. were mixed together, producing a liquid batch that could easily be applied by brush. The resulting coating was non-tacky after 2 to 3 hours and fully hardened after 20 hours. It was flexible and resistant to wear and impact.

Example 22

A mixture of 90 parts of the epoxy resin according to Example 14, 10 parts of ethylhexylglycide ether, 28 parts of Hardener A, 8 parts isopropanol, 5 g. phenol, 90 parts titanium dioxide and 150 parts of electrocorundum powder (particle life <0.03 mm.) was brushed onto a hard fiber board. The coating hardened and was free of any tackiness after 5 to 6 hours, and had an excellent surface gloss.

Example 23

100 parts of glycerine diglycide ether having 0.62 epoxy equivalents per 100 g. of resin, and 33 parts of Hardener A were mixed together. Molded bodies made from this mixture in the cold state were very flexible and had a glossy surface.

Example 24

100 parts of an aniline-base epoxy resin (Lokutherm 701 made by Farbenfabriken Bayer) having 0.56 epoxy equivalent per 100 g. of resin were mixed with 30 parts of Hardener A and 5 parts of phenol. Molded bodies prepared from this mixture were elastic and had a glossy surface.

Example 25

100 parts of an epoxy resin according to Example 14, 28 parts of Hardener A, 7 parts of tetrahydrofurfuryl alcohol and 5 parts of phenol were mixed together. Molded bodies made from this mixture were hardened for 5 hours at 60° C. They were very elastic and had a hard, glossy surface.

Example 26

100 parts of an epoxy resin made from Bisphenol A and epichlorhydrin and having 0.2 epoxy equivalents per 100 g. of resin were dissolved in 80 parts of methyl ethyl ketone. This solution was mixed with 11 parts of Hardener A and a thin coat of the resulting batch was applied onto a metal plate. After 3 hours of hardening at 120° C. a firmly adherent, elastic varnish coating was formed and which was characterized by its considerable hardness, scratch resistance and excellent gloss.

Example 27

90 parts of epoxy resin having 0.53 epoxy equivalents per 100 g. of resin, and manufactured by the conventional method from Bisphenol A and epichlorhydrin, 10 parts of ethylhexylglycidylether and 37 g. of 2-phenyl-3,3-bis-($\gamma$-aminopropyl)-3,4,5,6-tetrahydropyridine were thoroughly mixed together.

Molded bodies made from this mixture and hardened at 70° C. for 24 hours had the following mechanical properties

| Bending strength: kg./cm.$^2$ | 1260 |
| Tensile strength: kg./cm.$^2$ | 580 |
| Impact resistance: cm./kg./cm.$^2$ | 14 |
| Heat distortion temp. according to Martens | 90–92° C. |

What is claimed is:

1. A method for the preparation of a 3,4,5,6-tetrahydropyridine derivative containing at least one $\gamma$-aminopropyl group in the 3-position which comprises contacting a compound having more than one $\beta$-cyanethyl group in the $\alpha$-position in relation to a ketone group with hydrogen at a temperature below 180° C. in the presence of a catalytic amount of a hydrogenation catalyst, selected from the group consisting of Raney nickel, Raney cobalt and nickel carried on a support.

2. A method according to claim 1 which comprises effecting said hydrogenation at a temperature of from 80–150° C.

3. A method according to claim 1 including effecting said hydrogenation in the presence of an alkaline agent selected from the group consisting of alkali hydroxides, alkali alcoholates and quaternary ammonium bases.

4. A method according to claim 3 wherein said alkaline agent is sodium methylate.

5. A method according to claim 3 wherein said alkaline agent is trimethylbenzyl ammonium hydroxide.

6. A method according to claim 1 which comprises effecting said hydrogenation in the presence of a member selected from the group consisting of phenol, cresol, hydroquinone and resorcinol.

7. A method according to claim 6 wherein said group member is phenol.

8. A method according to claim 6 wherein said group member is hydroquinone.

9. A method according to claim 1 which comprises effecting said hydrogenation in the presence of ammonia and sodium methylate.

10. A method according to claim 1 which comprises effecting said hydrogenation in the presence of ammonia and trimethylbenzylammonium hydroxide.

11. A method according to claim 1 which comprises effecting said hydrogenation in the presence of ammonia and hydroquinone.

12. A method according to claim 1 which comprises effecting said hydrogenation in the presence of a solvent.

13. A method according to claim 12 wherein said solvent is a lower aliphatic alcohol with up to 4 carbon atoms.

14. A method according to claim 13 wherein said solvent is methanol.

15. A method according to claim 1 wherein said catalyst is a nickel catalyst.

16. A method according to claim 1 wherein said compound containing more than one β-cyanethyl group in the α-position in relation to a carbonyl group is a member selected from the group consisting of 1,1-bis-(β-cyanethyl)-propanone-(2), 1,1,1 - tris - (β-cyanethyl)-propanone-(2), 2,2-bis-(β-cyanethyl)-butanone-(3), 2-methyl-3,3-bis-(β-cyanethyl)-pentene-(1)-one-(4), and ω,ω,ω-tris-(β-cyanethyl)-acetophenone.

17. A 3,4,5,6-tetrahydropyridine having the formula:

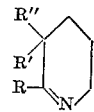

wherein R represents a member selected from the group consisting of lower alkyl and lower alkenyl, R' represents a member selected from the group consisting of γ-aminopropyl, lower alkyl and lower alkenyl and R" represents γ-aminopropyl, wherein R and R' taken together with the carbon atoms to which they are attached form phenyl.

18. A 3,4,5,6-tetrahydropyridine derivative according to claim 17 designated 2-methyl-3,3-bis(γ-aminopropyl)-3,4,5,6-tetrahydropyridine.

19. A 3,4,5,6-tetrahydropyridine derivative according to claim 17 designated 2,3-dimethyl-3-(γ-aminopropyl)-3,4,5,6-tetrahydropyridine.

20. A 3,4,5,6-tetrahydropyridine derivative according to claim 17 designated 2-methyl-3-isopropenyl-3-(γ-aminopropyl)-3,4,5,6-tetrahydropyridine.

21. A 3,4,5,6-tetrahydropyridine derivative according to claim 17 designated 2-phenyl-3,3-bis-(γ-aminopropyl)-3,4,5,6-tetrahydropyridine.

References Cited

Albertson et al., J. Am. Chem. Soc., vol. 72, pp. 2594–9, 1950.

Takata et al., J. Chem. Soc., Japan (Pure Chemistry Section), vol. 85, No. 3, pp. 237–8 (1964).

HENRY R. JILES, Primary Examiner.

A. L. ROTMAN, Assistant Examiner.

U.S. Cl. X.R.

260—2, 31.8, 33.2, 47, 80.3, 88.3